United States Patent [19]

Shibata

[11] Patent Number: 5,231,540
[45] Date of Patent: Jul. 27, 1993

[54] COMPACT ZOOM LENS SYSTEM

[75] Inventor: Hironori Shibata, Tokyo, Japan

[73] Assignee: Olympus Optical Co., Ltd., Tokyo, Japan

[21] Appl. No.: 913,413

[22] Filed: Jul. 15, 1992

[30] Foreign Application Priority Data

Jul. 16, 1991 [JP] Japan .................................. 3-175035

[51] Int. Cl.⁵ ...................... G02B 15/14; G02B 13/18; G02B 3/02; G02B 9/34
[52] U.S. Cl. .................................. 359/684; 359/687; 359/708; 359/774
[58] Field of Search ............... 359/687, 684, 693, 774, 359/686, 708

[56] References Cited

U.S. PATENT DOCUMENTS

| 3,501,224 | 3/1970 | Takahashi | 359/687 |
| 4,818,083 | 4/1989 | Mihara | 359/687 |
| 4,859,042 | 8/1989 | Tanaka | 359/687 X |

FOREIGN PATENT DOCUMENTS

| 215225 | 9/1987 | Japan | 359/774 |
| 2-39011 | 2/1990 | Japan . | |
| 2-53017 | 2/1990 | Japan . | |
| 3-12624 | 1/1991 | Japan . | |
| 3-12625 | 1/1991 | Japan . | |
| 3-33710 | 2/1991 | Japan . | |

OTHER PUBLICATIONS

Ishii et al Application No. 07/712,980 filed Jun. 10, 1991.

Primary Examiner—Bruce Y. Arnold
Assistant Examiner—David R. Parsons
Attorney, Agent, or Firm—Cushman, Darby & Cushman

[57] ABSTRACT

The invention relates to a compact, lightweight and inexpensive zoom lens system which, even when used with a small image sensor, allow the convex lenses to have a sufficient peripheral thickness and the concave lenses to have a sufficient central thickness and which comprises, in order from the object side, a first unit having a positive refracting power, a second unit having a negative and being movable during zooming, a third unit having a positive refracting power and remaining fixed in place and a fourth unit having a positive refracting power and being movable during zooming and focusing; said third unit comprising, in order from the object side, two lenses in all, one being a positive lens having a strong curvature on the object side and the other a negative lens having a strong curvature on the image side, and said third and fourth units each having at least one aspherical surface whose refracting power decreases as it is spaced away from the optical axis and conforming to the following conditions (1) and (2):

$$0.4 < |f_{31}/f_{32}| < 1, \quad (1) \text{ and}$$

$$0.7 < r_{3R}/r_{4F} < 3.0, \quad (2)$$

where $f_{31}$ is the focal length of the first lens of the third unit, $f_{32}$ is the focal length of the second lens of the third unit, $r_{3R}$ is the image-side radius of curvature of the the second lens of the third unit, and $r_{4F}$ is the object-side radius of curvature of the first lens of the fourth unit.

5 Claims, 3 Drawing Sheets

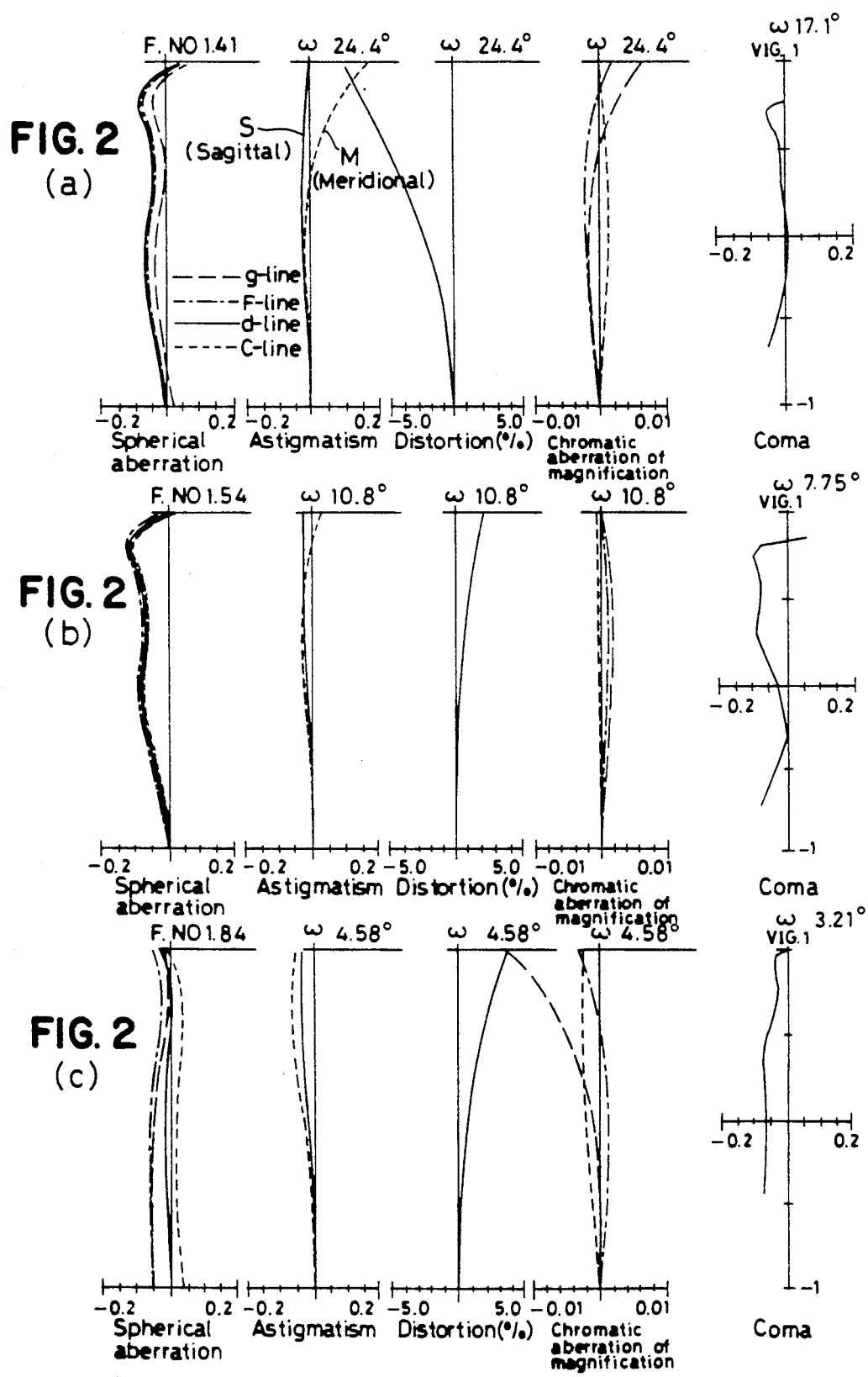

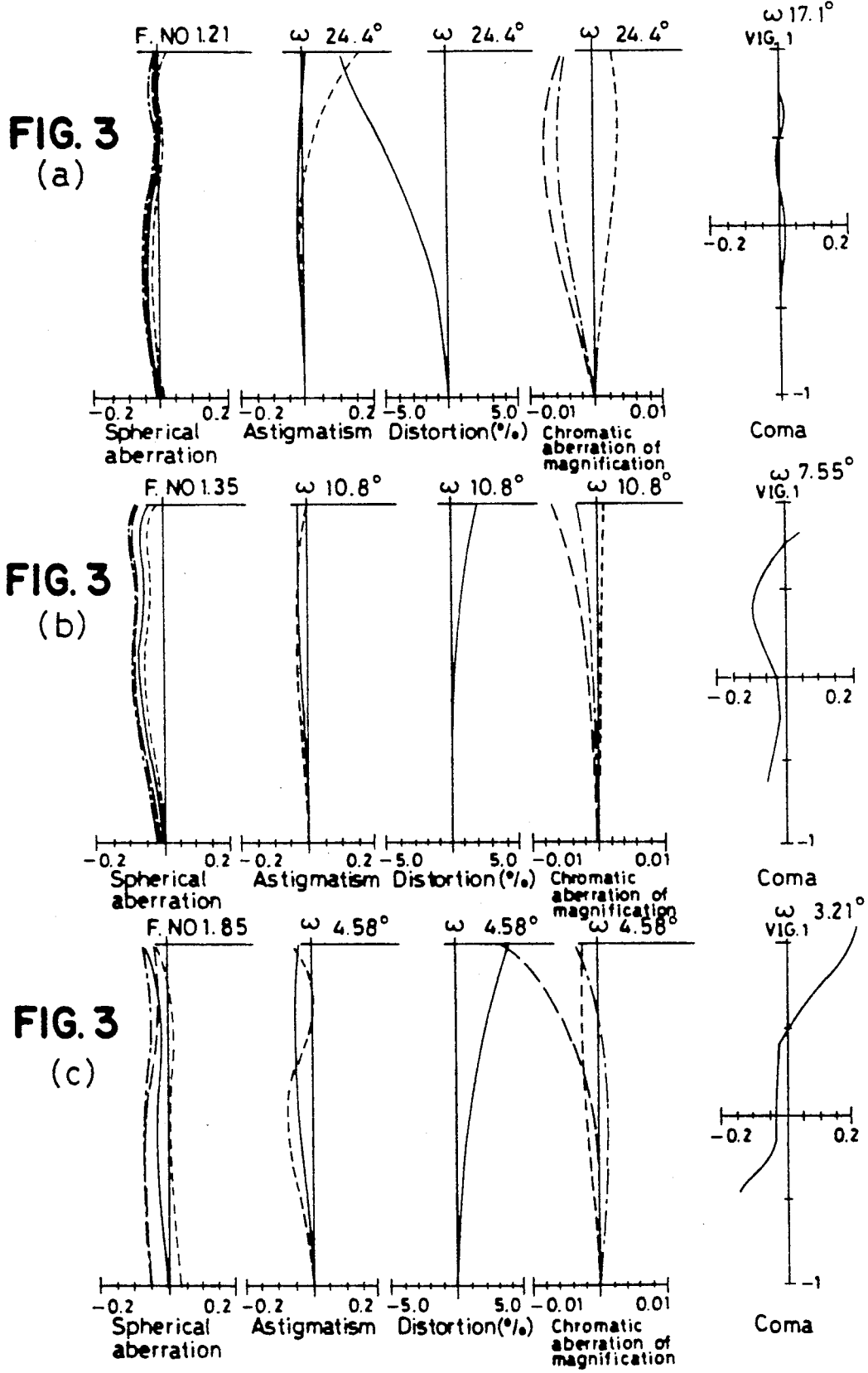

COMPACT ZOOM LENS SYSTEM

BACKGROUND OF THE INVENTION

The present invention relates generally to a zoom lens system and more particularly to a compact zoom lens system used with solid-state image sensors, etc.

Size, weight and cost reductions in video cameras are now in drastic progress. In particular, this is true of the size of solid-state image sensors, creating an increasing demand for size reductions in the lens systems used in combination with them.

Some zoom lens systems have been proposed to meet such demand and, of them, a four unit type zoom lens is found to be effective, in which the fourth unit is designed to compensate for an image position during zooming and perform a focusing function as well. Examples of this type of zoom lens system proposed to achieve size and cost reductions are set forth in Japanese Provisional Patent Publication Nos. Hei. 2-39011 and 3-12625. Still, much is left as to size reductions.

In addition, the conventional systems mentioned above cannot be applied directly to a solid-state image sensor of small size, say, about 6 mm or 4 mm in diagonal length, because the associated optical system diminishes in size in proportion to the sensor size, posing some processing problems, for instance, an insufficiency of the peripheral thickness of convex lenses or the central thickness of concave lenses.

SUMMARY OF THE INVENTION

Having been accomplished in view of the above-mentioned state-of-art-problems, this invention has for its object to provide a compact, lightweight and inexpensive zoom lens system which, even when used with a small image sensor, ensures that the convex lenses have a sufficient peripheral thickness while the concave lenses have a sufficient central thickness.

According to the present invention, this object is achieved by providing a compact zoom lens system characterized by comprising, in order from the object side, a first unit having a positive refracting power, a second unit having a negative and being movable during zooming, a third unit having a positive refracting power and remaining fixed in place and a fourth unit having a positive refracting power and being movable during zooming and focusing, said third unit comprising, in order from the object side, two lenses in all, one being a positive lens having a strong curvature on the object side and the other a negative lens having a strong curvature on the image side, and said third and fourth units each having at least one aspherical surface which decreases in refracting power as it is spaced away from the optical axis and conforming to the following conditions (1) and (2):

$$0.4 < |f_{31}/f_{32}| < 1, \quad (1) \text{ and}$$

$$0.7 < r_{3R}/r_{4F} < 3.0, \quad (2)$$

where $f_{31}$ is the focal length of the first lens of the third unit, $f_{32}$ is the focal length of the second lens of the third unit, $r_{3R}$ is the image-side radius of curvature of the the second lens of the third unit, and $r_{4F}$ is the object-side radius of curvature of the first lens of the fourth unit.

Preferably, the fourth unit should conform to the following conditions (3) and (4):

$$-0.3 < \beta_4 < -0.03, \quad (3) \text{ and}$$

$$-2 < r_{4F}/r_{4R} < -0.57, \quad (4)$$

where $\beta_4$ is the magnification of the fourth unit at the wide angle end, $r_{4F}$ is the object-side radius of curvature of the first lens of the fourth unit, and $r_{4R}$ is the radius of curvature of the surface of the fourth unit that is proximate to the image surface.

Preferably, said first lens unit should comprise, in order from the object side, a first negative meniscus lens and a second positive lens and said second lens unit should comprise, in order from the object side, a first negative lens, a second negative lens and a third positive lens.

Preferably, said first lens unit should have at least one aspherical surface conforming to the following condition (5):

$$1.2 \times 10^{-3} < |\Delta x|/f_W < 1.2 \times 10^{-2}, \quad (5)$$

where;

$$|\Delta x| = A_2 y_0^2 + A_4 y_0^4 + A_6 y_0^6 + A_8 y_0^8 + A_{10} y_0^{10} \quad (P=1)$$

$y_0 = (\frac{1}{4}) \cdot f_T/F_{NOT}$, $f_W$ = the focal length of the total system at the wide angle end, $f_T$ = the focal length of the total system at the telephoto end, and $F_{NOT}$ = the F-number at the telephoto end.

In the ensuing description, the construction and conditions of the invention will be explained together with how the invention acts.

Size reductions in zoom lenses are generally achieved by either increasing the refracting power of the zooming system in particular or decreasing the length of the image-formation system.

The former method has been practiced so far in the art, but too much is not expected of it, because it makes various aberrations even much worse. Instead, the present invention relies upon the latter method to make some improvement in the image-formation system of a conventional zoom lens system comprising a first unit having a positive refracting power, a second unit having a negative refracting power and being movable during zooming, a third unit having a positive refracting power and remaining fixed in place and a fourth unit having a positive refracting power and being movable during both zooming and focusing, said third and fourth units forming said image-formation system, thereby achieving a compact zoom lens system.

Referring first to how many units are needed for the image-formation system, at least one negative lens unit and at least two positive lens units may be used so as to achieve achromaticity and correction of various aberrations well enough. Referring here to how the third and fourth units are arranged, it is desired that the principal point of the third unit be located as near to the object side as possible so as to make the actual on-axial distance between the third and fourth units short. To this end, the third unit comprises, in order from the object side, one positive lens having a strong curvature on the object side and one negative lens having a strong curvature on the image side, and is arranged such that its principal point is located near to the object side. It is then desired that the fourth unit comprise a lens unit having a positive refracting power.

In the ensuing description, reference will be made to the conditional formulae used in the present invention.

Condition (1) concerns the ratio between the focal lengths of the first and second lenses of the third unit. Since the third unit is fixed in place, more preferable for size reduction is that the on-axial distance of the first and second lenses becomes shorter; if the distance between the first and second lenses of the third unit is made short, then they may be considered as forming a contact system. If the focal length of the first positive lens of the third unit is roughly determined, then Condition (1) expresses the refracting power of the third unit as well. In other words, if the upper limit of Condition (1) is exceeded, then the refracting power of the third unit would become too weak to converge rays, resulting in an increase in the height of rays incident on the fourth unit and so an increase in the back focus. Below the lower limit, on the other hand, it is required to strengthen the refracting power of the positive lens of the third unit, incurring the aggravation of spherical aberration, etc. This is true of even when some aspherical surface is used. In view of the foregoing, Condition (1) is set down.

Condition (2) concerns the ratio between the radius of curvature of the negative lens of the third unit on the image side and the radius of curvature of the surface of the fourth unit proximate to the object side. In the zoom lens system according to this invention, the third and fourth units come close to each other to a considerable extent, especially when a short-distance object point is brought into focus on the telephoto side or zooming focus movement is corrected, in which case the magnification of the second unit almost doubles. Also, the image-side curvature becomes too strong to correct aberrations, because the number of the negative lens incorporated in the third and fourth units is one in all. Accordingly or in order to make up for high order aberrations occurring on that surface, it is desired that the curvature of the surface adjacent thereto be let lie in the range defined by Condition (2). However, when the upper limit is exceeded, there is an increase in the positive amount of high order aberrations such as spherical aberration and coma. Below the lower limit, on the contrary, there is an increase in the negative amount of those aberrations. This is the reason that Condition (2) is set down.

Thus, some desired compact zoom lens system may be obtained by conforming to Conditions (1) and (2). Still, more preferable size reductions and better correction of aberrations are achieved by conforming to the following conditions:

$$-0.3 < \beta_4 < -0.03, \quad (3) \text{ and}$$

$$-2 < r_{4F}/r_{4R} < -0.57, \quad (4),$$

where
$\beta_4$ is the magnification of the fourth unit at the wide angle end,
$r_{4F}$ is the object-side radius of curvature of the first lens of the fourth unit, and $r_{4R}$ is the radius of curvature of the surface of the fourth unit that is proximate to the image surface.

Condition (3) is directed to the magnification of the fourth unit. By letting the magnification of the fourth unit lie in the range defined above, it is possible to provide a weak divergence of exit marginal rays without having to increase the positive refracting power of the third unit so much. When the upper limit is exceeded, it is required to increase the positive refracting power of the third unit, incurring an increase in the thickness of the positive lens of the third unit. When the lower limit is not reached, on the contrary, some difficulty is encountered in securing the peripheral thickness of the positive lens of the fourth unit.

Condition (4) is directed to the ratio between the radii of curvature of the surfaces of the fourth unit proximate to the object and image sides, respectively. By letting this ratio lie within the range defined by Condition (4), off-axial aberration in particular can be well corrected. In other words, exceeding and falling short of the upper and lower limits are unpreferred, because much coma and other aberrations occurs on the object-side surface in the former case and on the image-side surface in the latter case.

In this invention, it is preferable to apply an aspherical surface to at least one surface of each of the third and fourth units, said aspherical surface decreasing in refracting power as it is spaced away from the optical axis. This is because negative spherical aberration and off-axial aberration can be well corrected.

While this invention has so far been described primarily with reference to making the image-formation system, it is understood that much more size reduction may be achieved, if the zooming system is constructed as follows.

To this end, it is desired to let the first unit comprise two lenses, i.e., in order from the object side, a negative meniscus lens having an increased radius of curvature on the image side and a positive lens and the second unit comprise three lenses, i.e., in order from the object side, a negative lens, a negative lens and a positive lens.

As is the case with the image-formation system, the use of less lenses is advantageous for reducing the size of the zooming system. In consideration of achromaticity, however, it is required that the first and second units have at least two lenses for each.

More desirously, the second unit should be of a negative-negative-positive type using two negative lenses, partly because it has a strong refracting power, partly because it is preferred to reduce aberrational variations due to the fact that it is a movable unit, and so on.

For the first unit which increases in the height of on-axial rays at the telephoto end in particular, it is desired that any one surface thereof be made such aspheric as to conform to the following conditional formula (5), thereby correcting various aberrations at a minimum.

$$1.2 \times 10^{-3} < |\Delta x|/f_W < 1.2 \times 10^{-2}, \quad (5)$$

where $$\Delta x = A_2 y_0^2 + A_4 y_0^4 + A_6 y_0^6 + A_8 y_0^8 + A_{10} y_0^{10} \quad (P=1)$$

$y_0 = (\frac{1}{4}) \cdot f_T / F_{NOT},$
$f_W =$ the focal length of the total system at the wide angle end, $f_T$ = the focal length of the total system at the telephoto end, and $F_{NOT}$ = the F-number at the telephoto end.

Condition (5) defines the quantity of a deviation from the aspherical surface. Exceeding and falling short of the upper and lower limits are unpreferred, because the aspherical quantity is too large, resulting in overcorrection of negative spherical aberration in the former case and negative spherical, distortion and other aberrations at the telephoto end in particular are undercorrected in the latter case.

Here note that the aspherical surface used for the zoom lens system of this invention is expressed by $$x = (y^2/r)/[1 + \{1 - P(y^2/r^2)\}^{\frac{1}{2}}] + A_2 y^2 + A_4 y^4 + A_6 y^6 + A_8 y^8 + A_{10} y^{10}$$

In the above formula with x as the optical axis direction and y as the direction normal thereto, r represents the radius of curvature on the optical axis, $A_2$, $A_4$, $A_6$, $A_8$, $A_{10}$, ... stand for the aspherical coefficients, and P indicates the conical coefficient.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(a)-2(c) are aberration diagrams showing the spherical, astigmatism, distortion, chromatic aberration of magnification and coma of Example 1 at the wide angle end (a), standard setting (b) and telephoto end (c), and FIGS. 3(a)-3(c) are diagrams similar to those shown in FIG. 2.

DESCRIPTION OF THE PREFERRED EMBODIMENTS

Figure 1:
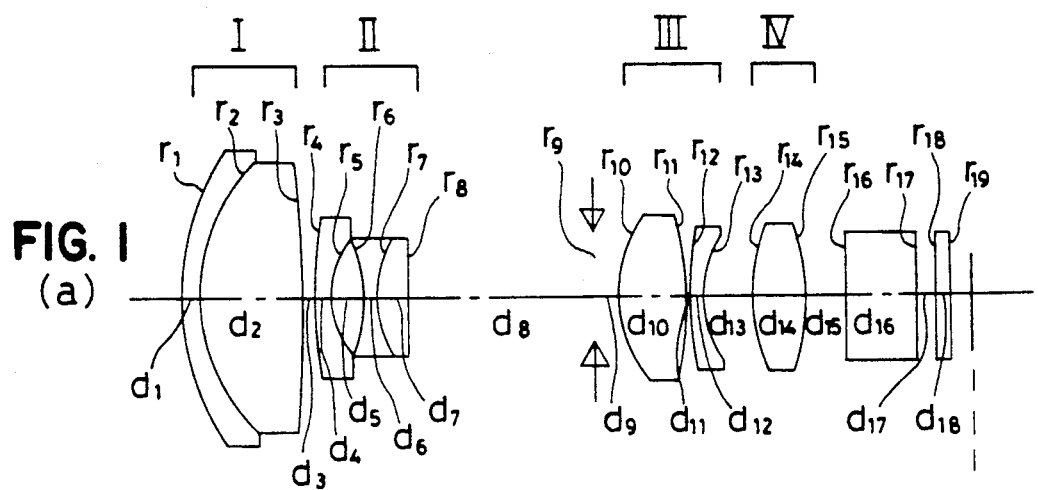
FIGS. 1(a)-1(c) represent in section the lenses according to Example 1 at the wide angle end (a), standard setting (b) and telephoto end (c)
Figure 1:
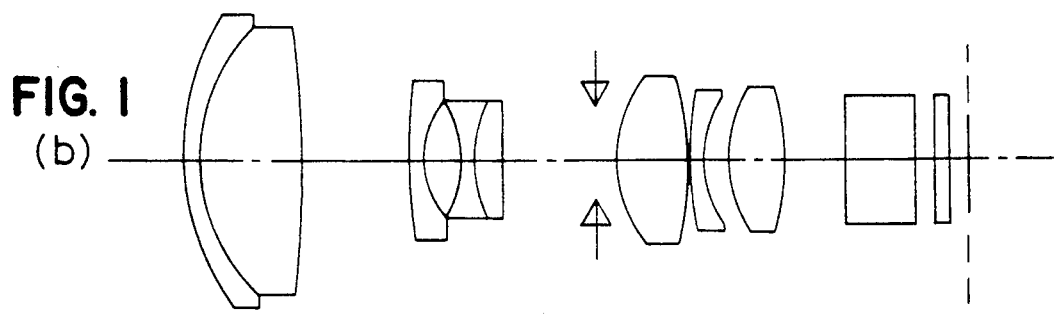
Figure 1:
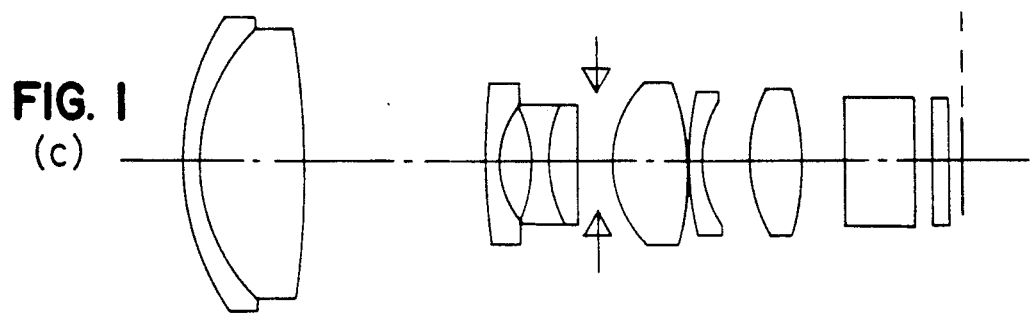

In the ensuing description, this invention will be explained specifically with reference to the zoom lens systems of Examples 1 and 2, whose lens data will be described later. FIGS. 1(a)-1(c) represent in section the lenses used in Ex. 1 at the wide angle end (a), standard setting (b) and telephoto end (c). Note, however, that the lenses of Ex. 2 are not shown, because they are substantially similar to those of Ex. 1.

In Examples 1 and 2, the first units I each comprise two lenses, say, in order from the object side a concave meniscus lens having a strong curvature on the image side and a double-convex lens which are cemented together; the second unit II each comprise three lenses, say, in order from the object side a concave meniscus lens having a strong curvature on the image side, a double-concave lens and a convex meniscus lens having a strong curvature on the object side, which are all cemented together; the third units III each comprises two lenses, say, in order from the object side, a double-convex lens and a concave meniscus lens having a strong curvature on the image side; and the fourth units IV each comprise a double-convex lens having a strong curvature on the object side. Referring here to aspherical surfaces, three are applied to the image-side surface of the second lens of the first unit I, the object-side surface of the first lens of the third unit III and the object-side surface of the positive lens of the fourth unit IV in each example, all decreasing in positive refracting power as they are spaced away from the optical axis. In each example, note that the 16th-19th surfaces show optical members such as filters.

In each example, the first unit I is designed to remain fixed during zooming. This construction produces additional effects such as a reduction in the power required for driving the first unit I that is heavy and has the largest lens diameter and simplification of the driving mechanism which results in its cost reduction.

Note that symbols that are used in the ensuing data but not referred to hereinbeofore have the following meanings.

f ... the focal length of the total system.
$f_{NO}$ ... the F-number.
$2\omega$ ... the field angle.
$r_1$, $r_2$, ... the radii of curvature of the lens surfaces.
$d_1$, $d_2$, ... the space between adjacent lens surfaces.
$n_{d1}$, $n_{d2}$, ... the d-line refractive indices of the lenses.
$\gamma_{d1}$, $\gamma_{d2}$, ... the Abbe's number of the lenses.

EXAMPLE 1

$f = 4.635 \sim 11.023 \sim 26.190$
$F_{NO} = 1.41 \sim 1.54 \sim 1.83$
$2\omega = 48.7 \sim 21.6 \sim 9.17°$

| | | | |
|---|---|---|---|
| $r_1$ = 14.0300 | $d_1$ = 1.000 | $n_{d1}$ = 1.84666 | $v_{d1}$ = 23.78 |
| $r_2$ = 10.0055 | $d_2$ = 5.826 | $n_{d2}$ = 1.58913 | $v_{d2}$ = 61.18 |
| $r_3$ = −50.7723 (Aspheric) | $d_3$ = (Variable) | | |
| $r_4$ = 37.7694 | $d_4$ = 0.800 | $n_{d3}$ = 1.69680 | $v_{d3}$ = 55.52 |
| $r_5$ = 5.2153 | $d_5$ = 1.950 | | |
| $r_6$ = −6.5351 | $d_6$ = 0.800 | $n_{d4}$ = 1.61800 | $v_{d4}$ = 63.38 |
| $r_7$ = 7.1396 | $d_7$ = 1.669 | $n_{d5}$ = 1.84666 | $v_{d5}$ = 23.78 |
| $r_8$ = 73.4665 | $d_8$ = (Variable) | | |
| $r_9$ = ∞ (Stop) | $d_9$ = 1.100 | | |
| $r_{10}$ = 5.4999 (Aspheric) | $d_{10}$ = 4.120 | $n_{d6}$ = 1.58913 | $v_{d6}$ = 61.18 |
| $r_{11}$ = −17.5409 | $d_{11}$ = 0.031 | | |
| $r_{12}$ = 38.6159 | $d_{12}$ = 0.800 | $n_{d7}$ = 1.84666 | $v_{d7}$ = 23.78 |
| $r_{13}$ = 5.9985 | $d_{13}$ = (Variable) | | |
| $r_{14}$ = 7.1633 (Aspheric) | $d_{14}$ = 3.136 | $n_{d8}$ = 1.56384 | $v_{d8}$ = 60.69 |
| $r_{15}$ = −10.6219 | $d_{15}$ = (Variable) | | |
| $r_{16}$ = ∞ | $d_{16}$ = 4.000 | $n_{d9}$ = 1.51633 | $v_{d9}$ = 64.15 |
| $r_{17}$ = ∞ | $d_{17}$ = 1.000 | | |
| $r_{18}$ = ∞ | $d_{18}$ = 0.790 | $n_{d10}$ = 1.48749 | $v_{d10}$ = 70.20 |
| $r_{19}$ = ∞ | | | |

Zooming Speces

| f | 4.635 | 11.023 | 26.190 |
|---|---|---|---|
| $d_3$ | 0.7000 | 6.0568 | 10.3187 |

-continued

| | | |
|---|---|---|
| $d_8$ | 10.6187 | 5.2620 | 1.0000 |
| $d_{13}$ | 2.6447 | 1.4754 | 2.6330 |
| $d_{15}$ | 2.1412 | 3.3105 | 2.1529 |

Aspherical Coefficients

Third surface
P = 1
$A_4 = 0.54737 \times 10^{-4}$
$A_6 = -0.31775 \times 10^{-6}$
$A_8 = 0.26974 \times 10^{-8}$
$A_{10} = -0.17043 \times 10^{-10}$ 10th surface
P = 1
$A_4 = -0.62140 \times 10^{-3}$
$A_6 = -0.45172 \times 10^{-4}$
$A_8 = 0.28120 \times 10^{-5}$
$A_{10} = -0.80918 \times 10^{-7}$ 14th surface
P = 1
$A_4 = -0.77129 \times 10^{-3}$
$A_6 = -0.48992 \times 10^{-4}$
$A_8 = 0.43263 \times 10^{-5}$
$A_{10} = -0.14124 \times 10^{-6}$ Example 2
f = 4.635 ~ 11.023 ~ 26.190
$F_{NO}$ = 1.21 ~ 1.35 ~ 1.85
2ω = 48.7 ~ 21.6 ~ 9.17°

| | | | |
|---|---|---|---|
| $r_1$ = 13.1382 | $d_1$ = 1.000 | $n_{d1}$ = 1.84666 | $\nu_{d1}$ = 23.78 |
| $r_2$ = 9.4081 | $d_2$ = 6.395 | $n_{d2}$ = 1.58913 | $\nu_{d2}$ = 61.18 |
| $r_3$ = −45.1980 (Aspheric) | $d_3$ = (Variable) | | |
| $r_4$ = 125.1694 | $d_4$ = 0.800 | $n_{d3}$ = 1.69680 | $\nu_{d3}$ = 55.52 |
| $r_5$ = 5.3509 | $d_5$ = 1.568 | | |
| $r_6$ = −7.3911 | $d_6$ = 0.800 | $n_{d4}$ = 1.61800 | $\nu_{d4}$ = 63.38 |
| $r_7$ = 6.2160 | $d_7$ = 1.669 | $n_{d5}$ = 1.84666 | $\nu_{d5}$ = 23.78 |
| $r_8$ = 22.4163 | $d_8$ = (Variable) | | |
| $r_9$ = ∞ (Stop) | $d_9$ = 1.100 | | |
| $r_{10}$ = 6.0000 (Aspheric) | $d_{10}$ = 5.402 | $n_{d6}$ = 1.58913 | $\nu_{d6}$ = 61.18 |
| $r_{11}$ = −17.7551 | $d_{11}$ = 0.031 | | |
| $r_{12}$ = 57.4530 | $d_{12}$ = 0.800 | $n_{d7}$ = 1.84666 | $\nu_{d7}$ = 23.78 |
| $r_{13}$ = 7.2808 | $d_{13}$ = (Variable) | | |
| $r_{14}$ = 7.0120 (Aspheric) | $d_{14}$ = 3.890 | $n_{d8}$ = 1.56384 | $\nu_{d8}$ = 60.69 |
| $r_{15}$ = −9.7668 | $d_{15}$ = (Variable) | | |
| $r_{16}$ = ∞ | $d_{16}$ = 4.000 | $n_{d9}$ = 1.51633 | $\nu_{d9}$ = 64.15 |
| $r_{17}$ = ∞ | $d_{17}$ = 1.000 | | |
| $r_{18}$ = ∞ | $d_{18}$ = 0.790 | $n_{d10}$ = 1.48749 | $\nu_{d10}$ = 70.20 |
| $r_{19}$ = ∞ | | | |

Zooming Speces

| f | 4.635 | 11.023 | 26.190 |
|---|---|---|---|
| $d_3$ | 0.7000 | 5.4874 | 9.2360 |
| $d_8$ | 9.5360 | 4.7486 | 1.0000 |
| $d_{13}$ | 2.6177 | 1.3300 | 2.4191 |
| $d_{15}$ | 1.8379 | 3.1256 | 2.0365 |

Aspherical Coefficients

Third surface
P = 1
$A_4 = 0.66482 \times 10^{-4}$
$A_6 = .85614 \times 10^{-7}$
$A_8 = -0.11304 \times 10^{-7}$
$A_{10} = 0.11999 \times 10^{-9}$ 10th surface
P = 1
$A_4 = -0.53816 \times 10^{-3}$
$A_6 = -0.26993 \times 10^{-4}$
$A_8 = 0.89122 \times 10^{-6}$
$A_{10} = -0.27294 \times 10^{-7}$ 14th surface
P = 1
$A_4 = -0.10114 \times 10^{-2}$
$A_6 = -0.18560 \times 10^{-4}$
$A_8 = 0.50994 \times 10^{-6}$
$A_{10} = -0.79841 \times 10^{-8}$ FIGS. 2(a)-2(c) and 3(a)-3(c) are aberration diagrams showing the spherical aberration, astigmatism, distortion, chromatic aberration of magnification and coma of Examples 1 and 2 at the wide angle ends (a), standard settings (b) and telephoto ends (c).

Set out below are the values found for Examples 1 and 2 by Conditional Formulae (1)-(5).

| | Example 1 | | | Example 2 | | |
|---|---|---|---|---|---|---|
| (1) | 0.897 | | | 0.838 | | |
| (2) | 0.837 | | | 1.04 | | |
| Magnification of the | −0.060 | −0.204 | −0.062 | −0.088 | −0.251 | −0.112 |

-continued

|  | Example 1 | Example 2 |
|---|---|---|
| Fourth Unit |  |  |
| (4) | −0.67 | −0.65 |
| (5) | $1.81 \times 10^{-3}$ | $2.24 \times 10^{-3}$ |

As has been described above, the compact zoom lens system of this invention comprises as small as eight lenses and so is short in the total length but, nonetheless, has a high zoom ratio of about 6 and a large aperture ratio expressed in terms of an F-number of 1.2-1.4. Thus, this invention makes it possible to achieve a compact, lightweight and inexpensive zoom lens system which, even when used with a small image sensor, allows the convex lenses to have a sufficient peripheral thickness and the concave lenses to have a sufficient central thickness.

What we claim is:

1. A compact zoom lens system comprising, in order from the object side, a first unit having a positive refracting power and remaining fixed in place during zooming, a second unit having a negative and being movable during zooming, a third unit having a positive refracting power and remaining fixed in place during zooming and a fourth unit having a positive refracting power and being movable during zooming and focusing, said third unit comprising, in order from the object side, two lenses in all, one being a positive lens having a stronger curvature on the object side and the other a negative lens having a stronger curvature on the image side, and said third and fourth units each having at least one aspherical surface the refracting power of the aspherical surface decreasing in value as a distance measured on the surface is spaced away from the optical axis, and satisfying the following conditions (1) and (2):

$$0.4 < |f_{31}/f_{32}| < 1, \quad (1) \text{ and}$$

$$0.7 < r_{3R}/r_{4F} < 3.0, \quad (2)$$

where $f_{31}$ is the focal length of the first lens of the third unit, $f_{32}$ is the focal length of the second lens of the third unit, $r_{3R}$ is the image-side radius of curvature of the second lens of the third unit, and $r_{4F}$ is the object-side radius of curvature of a first lens of the fourth unit.

2. A compact zoom lens system according to claim 1, further satisfying the following conditions (3) and (4):

$$-0.3 < \beta_4 < -0.03, \quad (3) \text{ and}$$

$$-2 < r_{4F}/r_{4R} < -0.57, \quad (4),$$

where;

$\beta_4$ is the magnification of the fourth unit at a wide angle end, $r_{4F}$ is the object-side radius of curvature of a first lens of the fourth unit, and $r_{4R}$ is the radius of curvature of the surface of the fourth unit that is proximate to a image surface.

3. A compact zoom lens system according to claim 1 or 2, wherein said first lens unit comprises, in order from the object side, a first negative meniscus lens and a second positive lens.

4. A compact zoom lens system according to claim 1 or 2, wherein said second lens unit comprises, in order from the object side, a first negative lens, a second negative lens and a third positive lens.

5. A compact zoom lens system according to claim 1 or 2, wherein said first lens unit has at least one aspherical surface conforming to the following condition (5):

$$1.2 \times 10^{-3} < |\Delta x|/f_W < 1.2 \times 10^{-2}, \quad (5)$$

where $$\Delta x = A_2 y_0^2 + A_4 y_0^4 + A_6 y_0^6 + A_8 y_0^8 A_{10} y_0^{10} \quad (P=1)$$

$y_0 = (\frac{1}{4}) \cdot f_T/F_{NOT}$, $f_W$ = the focal length of the total system at a wide angle end, $f_T$ = the focal length of the total system at a telephoto end, and $F_{NOT}$ = the F-number at the telephoto end.

* * * * *